United States Patent
Hillel et al.

(10) Patent No.: US 9,934,466 B2
(45) Date of Patent: Apr. 3, 2018

(54) ENHANCED PERSONALIZATION IN MULTI-USER DEVICES

(71) Applicant: YAHOO! INC., Sunnyvale, CA (US)

(72) Inventors: Eshcar Hillel, Binyamina (IL); Michal Aharon, Haifa (IL); Nadav Golbandi, Haifa (IL)

(73) Assignee: OATH INC., New York, NY (US)

(*) Notice: Subject to any disclaimer, the term of this patent is extended or adjusted under 35 U.S.C. 154(b) by 809 days.

(21) Appl. No.: 14/446,495

(22) Filed: Jul. 30, 2014

(65) Prior Publication Data
US 2016/0034815 A1 Feb. 4, 2016

(51) Int. Cl.
G06F 9/44 (2006.01)
G06N 7/02 (2006.01)
G06N 7/06 (2006.01)
G06N 5/04 (2006.01)

(52) U.S. Cl.
CPC ...................................... *G06N 5/04* (2013.01)

(58) Field of Classification Search
CPC ......................................................... G06N 5/04
USPC ......................................................... 706/52
See application file for complete search history.

(56) References Cited

U.S. PATENT DOCUMENTS

| | | | | |
|---|---|---|---|---|
| 8,024,324 B2* | 9/2011 | Amitay | ............ | G06F 17/30675 707/715 |
| 8,219,544 B2* | 7/2012 | Bluger | ............ | G06F 17/30091 707/711 |
| 8,285,483 B2* | 10/2012 | Amer-Yahia | .......... | G01C 21/00 701/428 |
| 8,510,248 B2* | 8/2013 | Koren | .................. | G06N 5/046 706/46 |
| 8,594,925 B2* | 11/2013 | Amer-Yahia | .......... | G01C 21/00 701/428 |
| 8,768,693 B2* | 7/2014 | Somekh | ............ | G06F 17/30265 348/231.4 |
| 9,151,618 B2* | 10/2015 | Amer-Yahia | .......... | G01C 21/00 |
| 9,251,406 B2* | 2/2016 | Lempel | ............. | G06Q 30/0255 |
| 9,348,924 B2* | 5/2016 | Somekh | ............ | G06F 17/30867 |
| 9,411,829 B2* | 8/2016 | Li | ..................... | G06F 17/30274 |
| 9,535,938 B2* | 1/2017 | Somekh | ............ | G06F 17/30312 |
| 2012/0102304 A1* | 4/2012 | Brave | ............... | G06F 17/30867 713/1 |

(Continued)

OTHER PUBLICATIONS

Caching at the wireless edge: design aspects, challenges, and future directions Dong Liu; Binqiang Chen; Chenyang Yang; Andreas F. Molisch IEEE Communications Magazine Year: 2016, vol. 54, Issue: 9 pp. 22-28 IEEE Journals & Magazines.*

(Continued)

*Primary Examiner* — Michael B Holmes
(74) *Attorney, Agent, or Firm* — James J. DeCarlo; Greenberg Traurig, LLP

(57) ABSTRACT

Disclosed herein is an enhanced device personalization that personalizes a user's experience with a device, e.g., a multi-user device. Rather than personalizing based on the specific user(s) that are using, an active entity, which represents a type of consumption, may be generated and used to make recommendations for personalizing an experience using the device. In a case of a multi-user device, each user's experience is personalized by determining an active entity for the user's experience and without knowledge of which user is using the device.

21 Claims, 8 Drawing Sheets

(56) References Cited

U.S. PATENT DOCUMENTS

2014/0280223 A1* 9/2014 Ram ............... G06Q 30/0251 707/748

OTHER PUBLICATIONS

Applying power meters for appliance recognition on the electric panel Gu-yuan Lin; Shih-chiang Lee; Jane Yung-jen Hsu; Wan-rong Jih 2010 5th IEEE Conference on Industrial Electronics and Applications Year: 2010 pp. 2254-2259 IEEE Conference Publications.*

A Tale of Two Fashions: An Empirical Study on the Performance of Native Apps and Web Apps on Android Yun Ma; Xuanzhe Liu; Yi Liu; Yunxin Liu; Gang Huang IEEE Transactions on Mobile Computing Year: 2017, vol. PP, Issue: 99 pp. 1-1 IEEE Early Access Articles.*

A Model of BGA Thermal Vias as an Example of Lumped Parameter Analysis in Thermal Modeling of SiPs and Stacked Die Packages Luigi Pietro Maria Colombo; Davide Paleari; Alexey Petrushin Proceedings of the IEEE Year: 2009, vol. 97, Issue: 1 pp. 70-77 IEEE Journals & Magazines.*

G. Adomavicius, R. Sankaranarayanan, S. Sen, and A. Tuzhilin. Incorporating contextual information in recommender systems using a multidimensional approach. ACM Transactions on Information Systems (TOIS), 23, 2005.

G. Adomavicius and A. Tuzhilin. Context-aware recommender systems. In F. Ricci, L. Rokach, B. Shapira, and P. B. Kantor, editors, Recommender Systems Handbook, pp. 217-253. Springer, 2011.

L. Baltrunas and X. Amatriain. Towards time-dependant recommendation based on implicit feedback. In CARS, 2009.

L. Baltrunas, B. Ludwig, and F. Ricci. Matrix factorization techniques for context aware recommendation. In RecSys, pp. 301-304, 2011.

L. Baltrunas and F. Ricci. Context-based splitting of item ratings in collaborative filtering. In RecSys, pp. 245-248, 2009.

P. Bellekens, G.-J. Houben, L. Aroyo, K. Schaap, and A. Kaptein. User model elicitation and enrichment for context-sensitive personalization in a multiplatform tv environment. In EuroITV, pp. 119-128, 2009.

D. M. Blei, A. Y. Ng, and M. I. Jordan. Latent Dirichlet allocation. Journal of Machine Learning Research, 3: 993-1022, 2003.

H. Cao, D. Jiang, J. Pei, E. Chen, and H. Li. Towards context-aware search by learning a very large variable length hidden markov model from search logs. In WWW, pp. 191-200, 2009.

N. Hariri, B. Mobasher, and R. Burke. Query-driven context aware recommendation. RecSys, 2013.

Y. Hu, Y. Koren, and C. Volinsky. Collaborative filtering for implicit feedback datasets. In ICDM, pp. 263-272, 2008.

A. Karatzoglou, X. Amatriain, L. Baltrunas, and N. Oliver. Multiverse recommendation: n-dimensional tensor factorization for context-aware collaborative filtering. In RecSys, pp. 79-86, 2010.

Y. Koren, R. Bell, and C. Volinsky. Matrix factorization techniques for recommender systems. Computer, 42(8):30-37, 2009.

S. Rendle, Z. Gantner, C. Freudenthaler, and L. Schmidt-Thieme. Fast context-aware recommendations with factorization machines. In SIGIR, pp. 635-644, 2011.

Y. Shi, A. Karatzoglou, L. Baltrunas, M. Larson, A. Hanjalic, and N. Oliver. TFMAP: Optimizing map for top-n context-aware recommendation. In SIGIR, pp. 155-164, 2012.

J. Weston, C. Wang, R. J. Weiss, and A. Berenzweig. Latent collaborative retrieval. In ICML, 2012.

R. W. White, A. Hassan, A. Singla, and E. Horvitz. From devices to people: attribution of search activity in multi-user settings. In WWW, pp. 431-442, 2014.

B. Xiang, D. Jiang, J. Pei, X. Sun, E. Chen, and H. Li. Context-aware ranking in web search. In SIGIR, pp. 451-458, 2010.

G. Xu, Y. Zhang, and X. Yi. Modelling user behaviour for web recommendation using Ida model. WI-IAT, 3, 2008.

M. Xu, S. Berkovsky, S. Ardon, S. Triukose, A. Mahanti, and I. Koprinska. Catch-up tv recommendations: show old favourites and find new ones. In RecSys, pp. 285-294, 2013.

A. Zhang, N. Fawaz, S. Ioannidis, and A. Montanari. Guess who rated this movie: Identifying users through subspace clustering. In UAI, pp. 944-953, 2012.

J. Zimmerman, K. Kurapati, A. L. Buczak, D. Schaffer, S. Gutta, and J. Martino. Tv personalization system: Design of a tv show recommender engine and interface. In personalized Digital Television: Targetting Programs to Individual Viewers, pp. 27-51. 2004.

Aharon, et al. Contextual Recommendation in Multi-User Devices; 8 pages.

* cited by examiner

ENHANCED PERSONALIZATION IN MULTI-USER DEVICES

FIELD OF THE DISCLOSURE

The present invention relates to device personalization, and more particularly to personalization in multi-user devices.

BACKGROUND

In many online experiences, multiple users, e.g., members of the same household, may consume or experience items of content using the same device, e.g., a shared device. By way of some non-limiting examples, users may use the same device for browsing the web, watching programs, such as television programs, etc. Many times, different users use the same login, which makes it difficult to differentiate between the different users using the same device.

SUMMARY

Conventional approaches attempt to personalize a user's experience with a given device, and must rely on information identifying the user for personalization. Such conventional approaches are unable to distinguish between different users that use a multi-user device, and therefore cannot successfully personalize an experience for each user using such a device.

The present disclosure seeks to address failings in the art and to provide enhanced personalization that personalized a user's experience with a device, e.g., a multi-user device. In accordance with one or more embodiments, an active entity, which represents a type of consumption, may be generated and used to make recommendations for personalizing an experience using the device. Embodiments of the present disclosure may be used in connection with users that use the same device, e.g., a multi-user device.

By way of a non-limiting example, a television, e.g., a smart TV, may be used by each of the members of a household. A father may enjoy watching science fiction programs, the mother may watch travel programs and a daughter may enjoy watching cartoons, e.g. Dora the Explorer. The father, mother and daughter may collectively enjoy watching Do-It-Yourself (DIY) programs.

In accordance with one or more embodiments, data collected about items consumed using a plurality of devices may be obtained and analyzed, e.g., using a statistical analysis, to generate a number of different entities, where an entity represents a type of consumption. By way of a non-limiting example, a "cooking" entity might be generated from analysis of the obtained data. Other non-limiting examples of entities that may be generated include a DIY entity, a travel entity, science fiction entity, a children's programming entity, etc. An entity identifies, for each program, a degree of like, or conversely a degree of dislike, relative to the generated entity. By way of a non-limiting example, programs related to science fiction may be more liked in a science fiction entity than programs related to DIY.

Using the above example, one or more of the generated entities may be suitable for the father, one or more generated entities may be suitable for the mother, one or more entities may be suitable for the daughter, and one or more of the generated entities may be suitable for the father, mother and daughter.

In accordance with one or more embodiments, a suitable entity may be identified independent of information identifying the user of the device. Using the above example, a generated entity suitable for the father may be identified without identifying that the father is the user using the device.

In accordance with one or more embodiments, a method is provided, the method comprising obtaining, by at least one computing device, data about a plurality of items consumed using a plurality of devices, at least one of the devices is a multi-user device; generating, by the at least one computing device, a plurality of entities, each entity associated with a type of consumption different from other entities in the plurality, each entity being identified independent of those users of a plurality of users that use the plurality of devices to consume the plurality of items; and making, by the at least one computing device and using an entity of the plurality, a recommendation comprising one or more items of the plurality for consumption using a device of the plurality, the recommendation being made independent of information identifying which one or more users of the plurality is using the device.

In accordance with one or more embodiments a system is provided, which system comprises at least one computing device comprising one or more processors to execute and memory to store instructions to obtain data about a plurality of items consumed using a plurality of devices, at least one of the devices is a multi-user device; generate a plurality of entities, each entity associated with a type of consumption different from other entities in the plurality, each entity being identified independent of those users of a plurality of users that use the plurality of devices to consume the plurality of items; and make, using an entity of the plurality, a recommendation comprising one or more items of the plurality for consumption using a device of the plurality, the recommendation being made independent of information identifying which one or more users of the plurality is using the device.

In accordance with yet another aspect of the disclosure, a computer readable non-transitory storage medium is provided, the medium for tangibly storing thereon computer readable instructions that when executed cause at least one processor to obtain data about a plurality of items consumed using a plurality of devices, at least one of the devices is a multi-user device; generate a plurality of entities, each entity associated with a type of consumption different from other entities in the plurality, each entity being identified independent of those users of a plurality of users that use the plurality of devices to consume the plurality of items; and make, using an entity of the plurality, a recommendation comprising one or more items of the plurality for consumption using a device of the plurality, the recommendation being made independent of information identifying which one or more users of the plurality is using the device.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the FIG. 1 provides a process flow example for use in accordance with one or more embodiments of the present disclosure.

FIG. 2 provides a component example which may implement some or all of the process flow shown in FIG. 1 in accordance with one or more embodiments of the present disclosure.

FIG. 3 provides an example of a statistical analyzer in accordance with one or more embodiments of the present disclosure.

FIG. 4 provides an offline entity identification option example in accordance with one or more embodiments of the present disclosure.

FIG. 5 provides an online entity identifier option example in accordance with one or more embodiments of the present disclosure.

FIG. 6 provides a recommendation example in accordance with one or more embodiments of the present disclosure.

DETAILED DESCRIPTION

Figure 1:
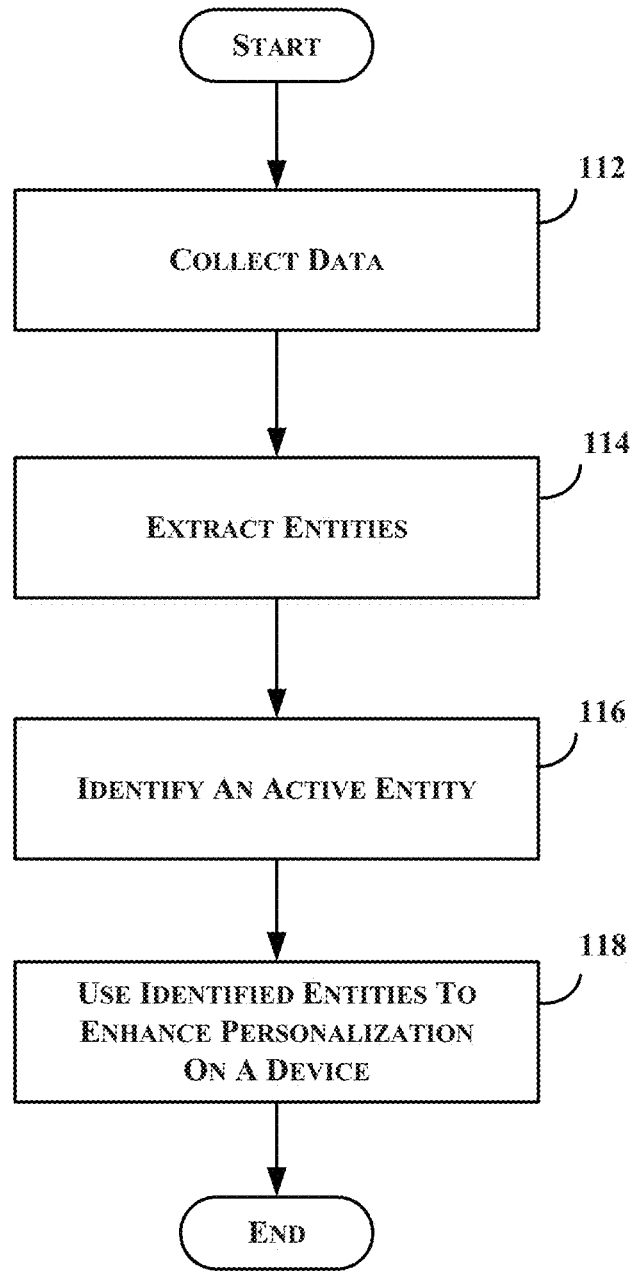

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for automatic user identification, which may be used for enhanced personalization of items, e.g., items of content, for consumption using a device, e.g., a multi-user device. By way of a non-limiting example, users of a multi-user device, e.g., occupants of a household, may each be associated with one or more entities. Each entity may be used to make a recommendation comprising one or more items for consumption by a user, or users, using a device.

In accordance with one or more embodiments, each entity may be represented by a probability distribution over a set of items that may be consumed, e.g., experienced, watched, listened to, etc. by users, which probability distribution may be used to automatically infer or predict the identity of an active entity. An active entity may be used to recommend a set of items, e.g., a set of programs, which items may be of interest to a user, or users, using a given device, for which the active entity is identified. In other words, given an identified entity, e.g., active entity, for a given device, a set of items may be recommended for consumption using the device, and such recommendation may be made without knowledge of the user, or users, currently using the device.

Embodiments of the present disclosure provide an enhanced device personalization that personalizes a user's experience with a device, e.g., a multi-user device. Rather than personalizing based on the specific user(s) that are using a device, an active entity, which represents a type of consumption, may be generated and used to make recommendations for personalizing an experience using the device. In a case of a multi-user device, each user's experience is personalized by determining an active entity for the user's experience and without knowledge of which user is using the device.

In accordance with one or more embodiments, an entity may be a type of consumption, with each entity representing a different type of consumption. By way of a non-limiting example, a "cooking" entity in a programming environment may be associated with programs related to cooking in some manner. A probability distribution for a "cooking" entity will likely have higher probabilities associated with cooking programs, or programs related to cooking, than the probabilities associated with cartoon programs, especially the cartoon programs lacking any content related to cooking.

Embodiments of the present disclosure may be used in connection with a device that is used by more than one user, e.g., which device is referred to herein as a multi-user device. While a device may be used at different times by different users, there is no need to know which user is currently using the multi-user device. Instead of identifying the user, embodiments of the present disclosure identify an active entity, and use the active entity to make an item recommendation.

By way of a non-limiting example, a recommendation may be made in response to a request by a user of the device, in which case there is no need for the user or the request to supply user identification information. By way of some further non-limiting examples, a recommendation may be made by the device, a content provider, a web site server, etc.

In the following discussion, embodiments of the present disclosure are described in connection with programs watched using a device such as a television. It should be apparent that embodiments of the present disclosure may be used in connection with any items consumed by any type of device, including video, audio, multimedia, still images, etc.

FIG. 1 provides a process flow example for use in accordance with one or more embodiments of the present disclosure. At step 112, data, e.g. a list of items consumed by each device, is collected, or otherwise obtained. The data may identify a time information, a time of day, a period of time, which may span more than one hour, etc. The list of items may be across multiple households and devices. At step 114, the data may be analyzed to extract multiple, different entities. Steps 112 and 114 may be performed offline. T The list of items consumed by each device may be analyzed using a statistical analysis such as latent dirichlet allocation (LDA), to generate multiple, different entities. In accordance with one or more such embodiments, an entity may represent a type of item consumption and may be represented as a distribution over all items that may be consumed, where the distribution reflects, for each item, a probability of consuming the item. Each entity may reflect a different type of consumption, e.g., a "cooking" entity will likely denote a high probability for a cooking program and a low probability for a cartoon program. In addition to generating an entity distribution may further produce a list of active entities, or main active patterns per device.

In accordance with one or more embodiments, step 114 may generate an entity distribution over device and an item distribution over entity. An entity distribution over device may comprise a probability distribution for each device of the plurality, each device's probability distribution comprising a probability for each entity of the plurality, each entity's probability representing a probability of the device being used to consume one or more items of the type represented by the entity's type of consumption. An item distribution over entity may comprise an item probability distribution over entity comprising a probability distribution for each entity of the plurality, each entity's probability distribution comprising a probability for each item of the plurality, each item's probability representing a probability of consumption of the item in a context of the entity's type of consumption.

At step 116, an active entity may be identified. An active entity may be identified using a context, such as recent consumed items. In such a case, an active entity might be identified by mapping the context, e.g., consumed items, to an entity, e.g., the "cooking" entity. In such a case, an entity associated with consumed items may be assumed to be the same entity identified at step 116, e.g., assuming continuity of the watching entity. Using this approach, the context is used to select an active entity for a device from among the entities generated in step 116.

As another alternative, an active entity may be identified at step 116 using watching patterns identified for each entity. By way of a non-limiting example, for each entity, a history of the devices associated with the entity may be analyzed, e.g., using a statistical analysis such as LDA. For each entity, a matrix may be created that identifies, for each device, a list of timeslots in a certain time period, e.g., a week, in which the entity, e.g., the "cooking" entity, was active. Such a matrix might identify that a given device was used to watch items that belong to an associated entity on Sunday and Wednesday at 19:00 and 21:00, respectively.

Using a statistical analysis, such as LDA, on each of the consumption matrices, different watching patterns may be identified for each entity. By way of a non-limiting example, items of the type consumed in connection with a "cooking" entity are watched on Sunday, Tuesday and Thursday at 20:00, while items of the type consumed in connection with another entity are watched on Monday and Wednesday at 10:00. Using this data for each device, a probability of "cooking" entity items being watched for each timeslot may be identified, which may be used to identify one of the generated entities as the active entity on a given device at a given point in time. Using this technique, a probability of a specific entity being active at a given point in time may be determined, even in a case that the device was never active at this specific time slot in the past.

At step 118, the identified active entity may be used to enhance personalization. By way of a non-limiting example, the identified active entity may be used to recommend one or more items, e.g., programs, to a user, or users, using a given device. Embodiments of the present disclosure provide an ability to personalize device use for a current user, or users, without requiring the user, or users, to provide any identification, e.g., logging in.

Figure 2:
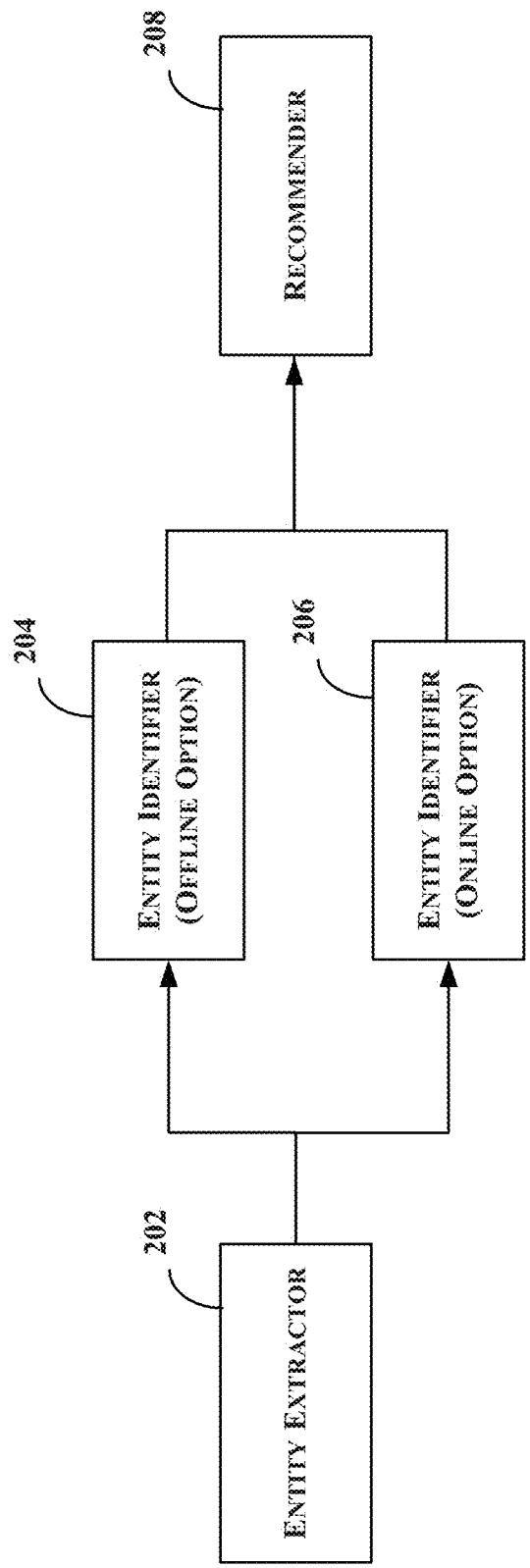

FIG. 2 provides a component example which may implement some or all of the process flow shown in FIG. 1 in accordance with one or more embodiments of the present disclosure. In accordance with one or more embodiments, the components shown in FIG. 2 may be performed by one or more computing devices, e.g., user computing device(s), server computing device(s) etc. While the components are shown as separate components, it should be apparent that one or more of the components may be combined into a single component.

Entity extractor 202 may use a list of devices and a list of programs watched by each device to generate, or extract, multiple, different entities. In accordance with one or more embodiments, each entity comprises a distribution over all of the items, e.g., programs, which may be consumed using one or more devices. The generated distribution identifying a probability of consuming the item, e.g., program. The extracted entities generated and identified by entity extractor 202 may be input to one or both of the entity identifiers 204 and 206. Entity identifier 204 may be referred to as an offline option, which may be used in a case where there may be little, if any, active entity information, e.g., where no user is currently watching the television and/or the device is offline. Entity identifier 204 may identify an active entity for a device given a time interval, e.g., given a time of day, one or more hours of a day, a day of the week, a specific calendar date, a holiday, time of year, etc.

Entity identifier 206 may be referred to as an online option as it uses activity information for a given device. The device may have an identified active entity determined using entity identifier 204 and/or entity identifier 206. The current activity information may be information identifying a current item, e.g., a program, being experienced using the device. The current activity information may be used to identify the entity to which the current item being watched belongs, thereby identifying an active entity for making recommendations to the user(s) currently using the device. It should be apparent that one or both of entity identifiers 204 and 206 may be used to identify an active entity.

Recommender 208 may use the active entity identified by one or both of entity identifiers 204 and 206 to make one or more recommendations. By way of a non-limiting example, recommender 208 may recommend one or more items, e.g., programs, one or more advertisements, etc., for consumption using the device. One or more items in the recommendation may be presented to the device user(s) for selection, one or more items from the recommendation may be automatically presented to the device user(s), etc.

Figure 3:
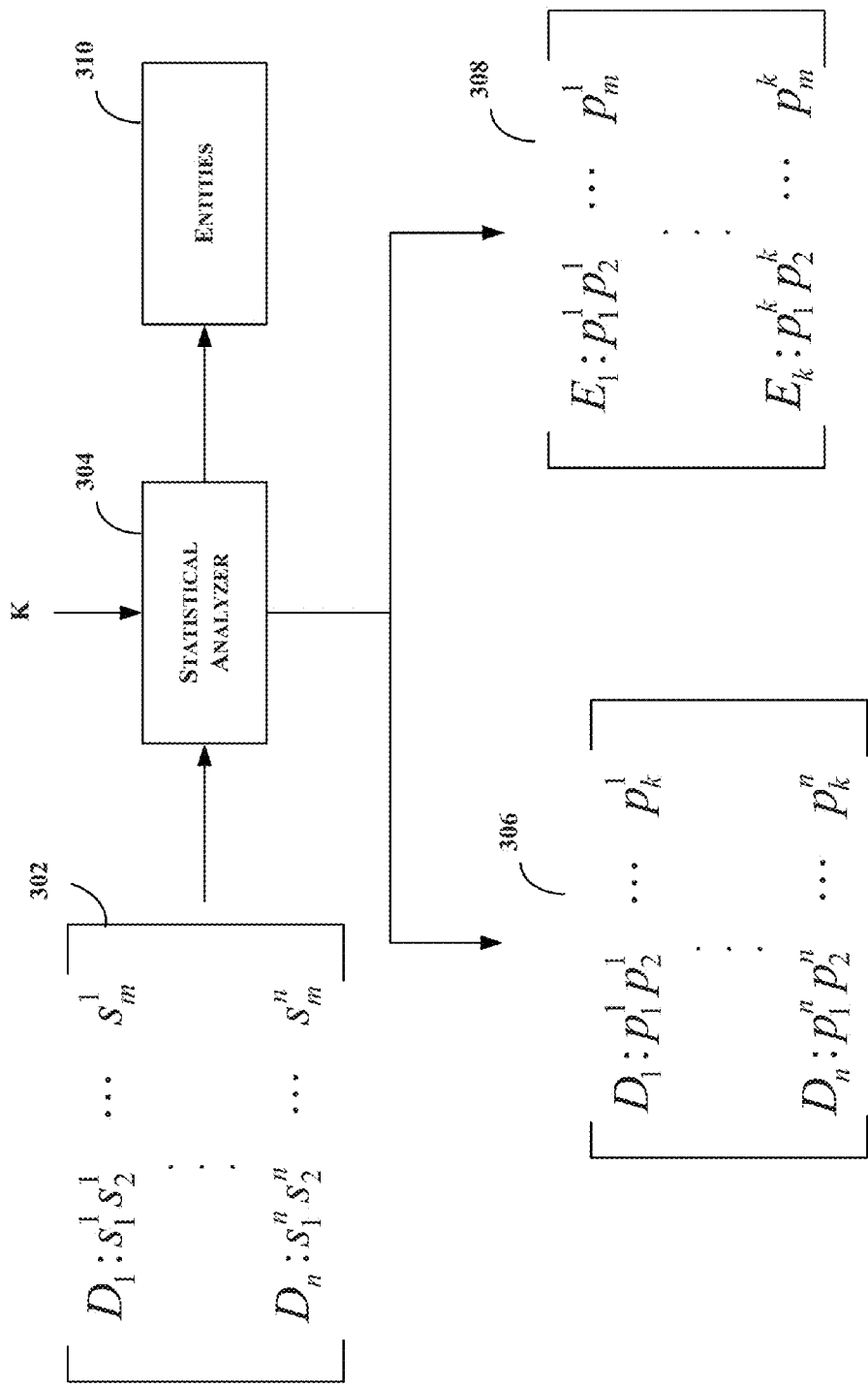

FIG. 3 provides an example of a statistical analyzer in accordance with one or more embodiments of the present disclosure. In the example shown in FIG. 3, statistical analyzer 304 uses input such as that shown by matrix 302. In the example shown, matrix 302 includes device characteristics and item, e.g., program, characteristic information. By way of a non-limiting example, each row of matrix 302 corresponds to a device, e.g., $D_1$ corresponds to a given device, of a set of n devices. For a given device, e.g., $D_1$, each item in a set of m items has an associated entry identifying a number of times that the item was experienced using the device in a given period of time, e.g., month, week, etc. In a case of a series, such as Dora the Explorer, of the episodes may be represented by a single entry, e.g., $s_1^1$, for a given device, $D_1$. For each entry, s represents the number of times the item was experienced, e.g., a program was seen, the subscript is the item, e.g., program, identifier, or index, and the superscript is the device identifier, or index. Matrix 302 may represent a device and item consumption history, which becomes input to statistical analyzer 304.

Statistical analyzer 304 may represent any perform any type of statistical analysis, including and without limitation LDA. Statistical analyzer 304 uses the data represented by matrix 302 in FIG. 3, e.g., data identifying a program watching history per device, to generate one or more statistical distributions. In the example shown in FIG. 3, statistical analyzer 304 generates an entity distribution over device 306 and a show distribution over entity 308. Distribution 306 provides a probability distribution for each device, D, of the n devices, where each entry indicates a probability of the device being used to consume items of the type represented by a given entity of k entities. By way of a non-limiting example, $p_k^n$ of distribution 306 indicates the probability of the $n^{th}$ device, $D_n$, being used to consume an item of the type represented by the $k^{th}$ entity, $E_k$. Distribution 308 provides a probability distribution for each entity, E, of k entities, where each entry indicates a probability of an item being of the type represented by a given entity. By way of a non-limiting example, entry $p_m^k$ of distribution 308 indicates the probability of the $m^{th}$ item being of the type represented by the $k^{th}$ entity.

In accordance with one or more embodiments, statistical analyzer 304 may receive as input the number of entities, k, to be identified, and statistical analyzer 304 may generate a listing of each of the k entities 310 in addition to distributions 306 and 308.

Referring again to FIG. 2, entity identifier 204 and entity identifier 206 may each output information identifying a device, e.g., device ID, and an entity, e.g., entity ID. Entity identifier 204 may receive information such as a device ID and a time interval. Entity identifier 206 may receive a device ID and information identifying a current program, e.g., a program ID.

In accordance with one or more embodiments, entity identifier 204 uses historical data to make a prediction as to which entity is likely to be turning on the television at a given time. By way of a non-limiting example, entity identifier 204 may use historical watching pattern information to identify that a likely entity as the active entity, e.g., identify an entity as the entity whose items are being experienced using a given device. By way of a further non-limiting example, entity identifier 204 may identify the active entity for a Sunday evening to be the "cooking" entity.

Figure 4:
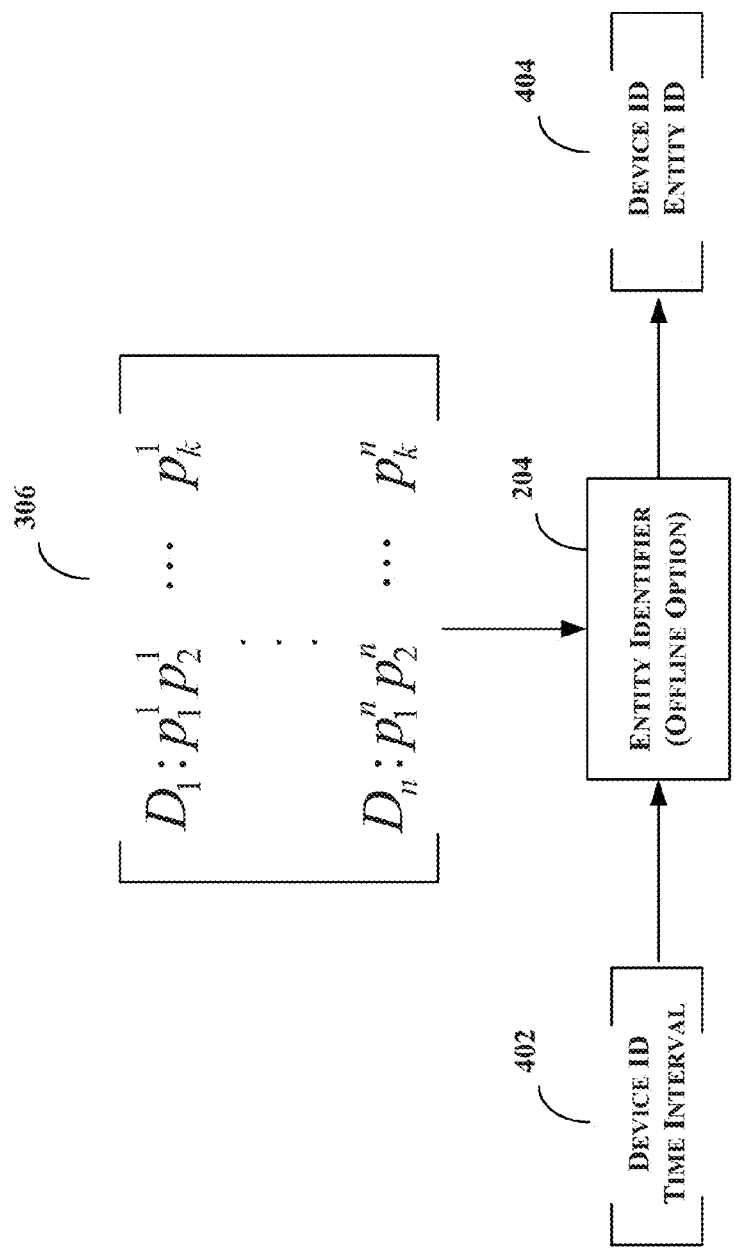

FIG. 4 provides an offline entity identification option example in connection with the entity identifier 204 in accordance with one or more embodiments of the present disclosure. In the example shown in FIG. 4, there is an instance of distribution 306 for each time interval, which may be identified by statistical analyzer 304, or from output provided by statistical analyzer 304. In the example of FIG. 4, entity identifier 204 uses input 402, e.g., information identifying a device and a time interval, to generate output 404, e.g., information identifying the device, such as a device ID, and information identifying an entity currently active on the device, or active entity, such information may comprise an entity ID. The entity identified by entity identifier 204 may be the entity having the highest probability of being the active entity for the given device. Entity identifier 204 uses the distribution 306 associated with the given time interval identified by input 402 and the row associated with the device identified by input 402 to identify the active entity. By way of a non-limiting example, the active entity identified by entity identifier 204 may be the entity having the highest probability of being the active entity for the given device.

Figure 5:
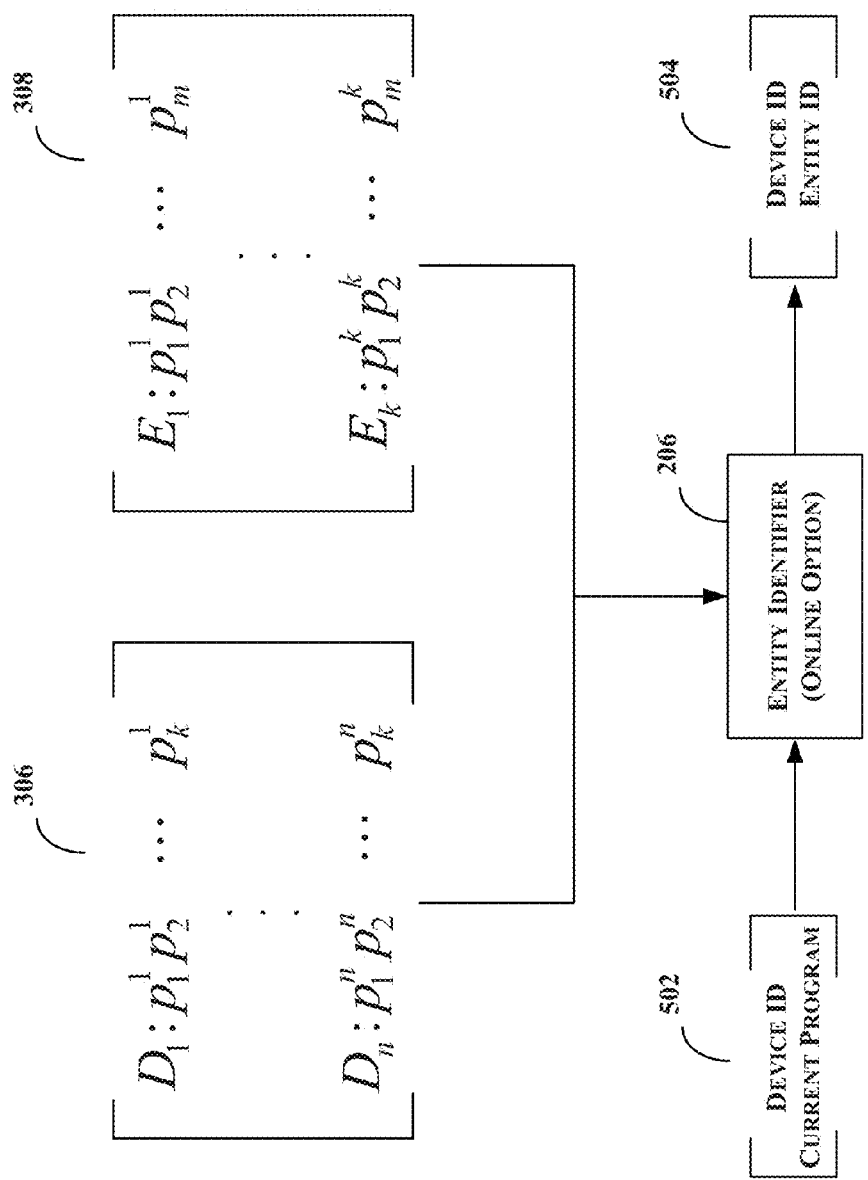

FIG. 5 provides an online entity identifier option example in connection with the entity identifier 206 in accordance with one or more embodiments of the present disclosure. In the example shown in FIG. 5, entity identifier 206 uses input 502, e.g., information identifying a device and a current item being experienced using a device, e.g., a program being watched via the device, to generate output 504, e.g., information identifying the device, such as a device ID, and information identifying an active entity, such as an entity ID.

By way of a non-limiting example, the current program may be identified using one or more of a program ID, a description, a title, etc. Entity identifier 206 uses distributions 306, e.g. an entity distribution over device, and 308, e.g., a show distribution over entity. By way of a non-limiting example, entity identifier 206 may use a device ID from input 502 to locate the row in distribution 306 corresponding to the identified device. Distribution 306 may be a distribution associated with a current time interval of the current program.

In distribution 306, the row associated with the identified device comprises, for each entity of k entities, a probability that the entity is the active entity being experienced using the device. Entity identifier 206 may use the current program identified using input 502 and distribution 308 to identify, for each entity of k entities, a probability that the entity is the active entity being experienced using the device, where the entity's probability is the probability, in the entity's row in distribution 308, associated with the item currently being experienced using the device.

Thus, two probabilities may be identified for each entity using distributions 306 and 308, which probabilities may be used to identify the entity currently being experienced using the device, or the device's active entity. In other words, a device ID may be used with distribution 306 to identify a probability, for each entity, that the entity is the device's active entity, the current program information may be used with distribution 308 to identify a probability, for each entity, that the entity is the device's active entity, and the probabilities retrieved from distributions 306 and 308 may be used to identify the active entity.

By way of a non-limiting example, the entity identified in output 504 may be the entity that has an associated high probability, relative to the other entities' probabilities, in distribution 306, which entity may also indicate a high probability for the current program, relative to the other programs' probabilities for that entity and for other entities, in distribution 308.

As yet another non-limiting example, an entity's probability of being the active entity may be a combination, e.g., a multiplication, of the entity's probability identified using distribution 306 and the entity's probability identified using distribution 308. In this example, the entities may be ranked according to each entity's aggregated probability, and the highest, or lowest, ranked entity might be selected as the active entity. Alternatively, an entity's probability from distribution 308 might be used as a weighting to weight the entity's probability from distribution 306, or vice versa. The entities may be ranked according to each entity's weighted probability, and the highest, or lowest, ranked entity might be selected as the active entity.

Figure 6:
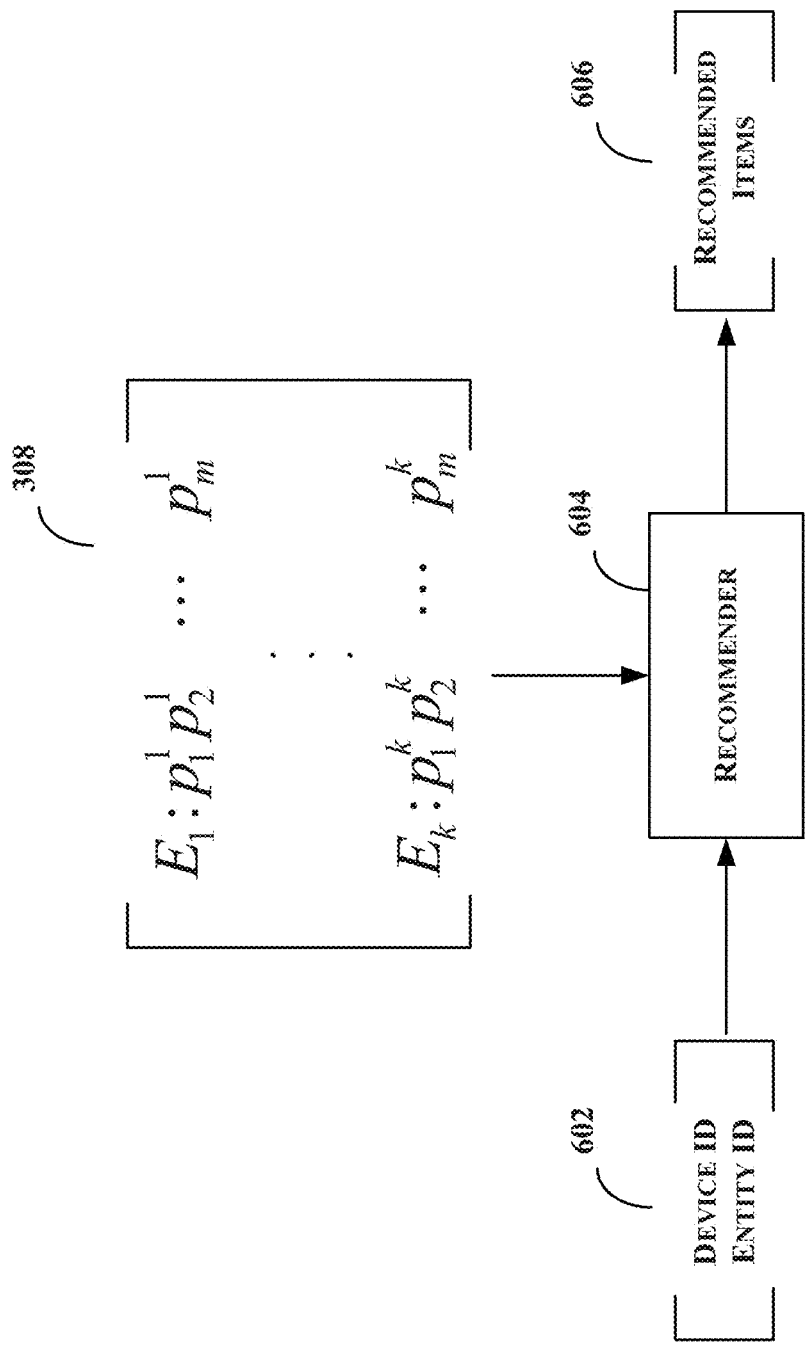

As illustrated in FIGS. 4 and 5, either one or both of entity identifiers 204 and 206 may identify an entity, e.g., by identifying an entity ID associated with one of the k entities, for a given device. The entity identified by entity identifiers 204 and/or 206 may be used to recommend one or more items, e.g., programs or shows, for a user, or group of users, currently using a given device. FIG. 6 provides a recommendation example in accordance with one or more embodiments of the present disclosure. In the example shown in FIG. 6 recommender 604 receives input 602, including entity identification information, e.g., entity ID, and generates a set of items, e.g., one or more items, as a recommendation in output 604.

By way of a non-limiting example, recommender 604 may use an entity ID, or other information identifying the entity, to retrieve the set of probabilities comprising a probability for each item, e.g., program, in the set of m items. The probabilities associated with the identified entity comprising a probability for each item that the entity is the entity to which the item belongs. Recommender 604 may use each item's probability to select one or more items for the recommendation. By way of some non-limiting examples, recommender 604 might process a list of programs that fit the identified entity in decreasing order of probability and apply one or more filters to generate a set of recommended programs as output 606. The list of programs may be filtered based on availability, such as availability based on the current time, based on subscription, on demand availability, etc. As yet other examples of filters, or considerations, recommender 604 may use information about the content of the program(s), e.g., overall suitability and/or suitability for children and/or adults, etc., information indicating whether the program(s) is/are first run versus repeat programs, etc.

In accordance with one or more embodiments of the present disclosure, output 606 may be used to provide the user, or users, currently using a device with a list of recommended items to experience using the device, e.g., a set of programs to watch on the television, a set of web content items, such as web pages, articles, etc., to view on a computing device, a set of songs to listen to using a media playing device, etc. The device user(s) need not identify as a particular user, e.g., by logging in or otherwise providing user identification information, such as by way of facial recognition, by unique gestures, etc.

In accordance with one or more embodiments, an entity need not correspond to a given user or users; an entity may be identified without knowing the user(s) using a device. A user might be referenced with respect to an entity, e.g., a "cooking" entity user. An item may be referred to with respect to an entity, e.g., a "cooking" entity program.

In a non-limiting example application, a smart television, or TV, may be a device shared by members of a household. The smart TV may be configured to collect information about what is being watched via the smart TV and to recommend programs to be watched via the smart TV. Alternatively, the smart TV may collect information, forward the information to another computing device, e.g., a server, which is configured to recommend programs to be watched via the smart TV. The household may comprise the number of people whose individual viewing habits and tastes are likely to vary. In addition to individual viewing habits and tastes, various groupings of members of the household may have different viewing habits and tastes. As discussed above, the identity(ies) of the individual(s) need not be known, and are likely not known, in order to make programming recommendations.

In the example, a program currently being watched as well as a time of day may be used as context for recommending one or more programs to watch next. Context may include other information, such as and without limitation the device that is currently being used. The recommended programs may be selected from a list, or inventory, of available programs. By way of a non-limiting example, a recommender, e.g., recommender 604, may use the device ID, current program ID, current time t, and an inventory of available programs to watch next to make a recommendation.

Figure 7:
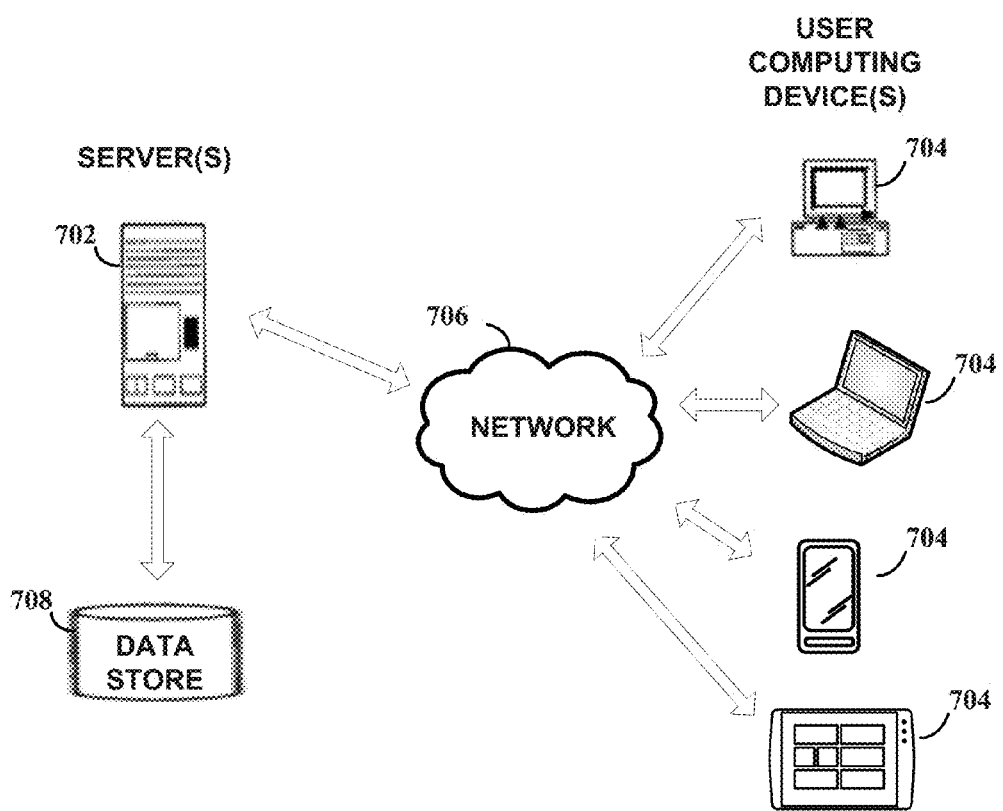
FIG. 7 illustrates some components that can be used in connection with one or more embodiments of the present disclosure.

FIG. 7 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 702 can be configured to execute program code, instructions, etc. to provide functionality in accordance with one or more embodiments of the present disclosure.

Computing device 702 can serve content to user computing devices 704 using a browser application via a network 706. Data store 708 may be used to store program code to configure a server 702 to functionality in accordance with one or more embodiments of the present disclosure.

The user computing device 704 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computing device 704 can include one or more processors, memory, a removable media reader, network interface, display and interface, and one or more input devices, e.g., keyboard, keypad, mouse, etc, and input device interface, for example. One skilled in the art will recognize that server 702 and user computing device 704 may be configured in many different ways and implemented using many different combinations of hardware, software, or firmware.

In accordance with one or more embodiments, a computing device 702 can make a user interface available to a user computing device 704 via the network 706. The user interface made available to the user computing device 704 can include content items, or identifiers (e.g., URLs) selected for the user interface in accordance with one or more embodiments of the present invention. In accordance with one or more embodiments, computing device 702 makes a user interface available to a user computing device 704 by communicating a definition of the user interface to the user computing device 704 via the network 706. The user interface definition can be specified using any of a number of languages, including without limitation a markup language such as Hypertext Markup Language, scripts, applets and the like. The user interface definition can be processed by an application executing on the user computing device 704, such as a browser application, to output the user interface on a display coupled, e.g., a display directly or indirectly connected, to the user computing device 704.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 7. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 8:
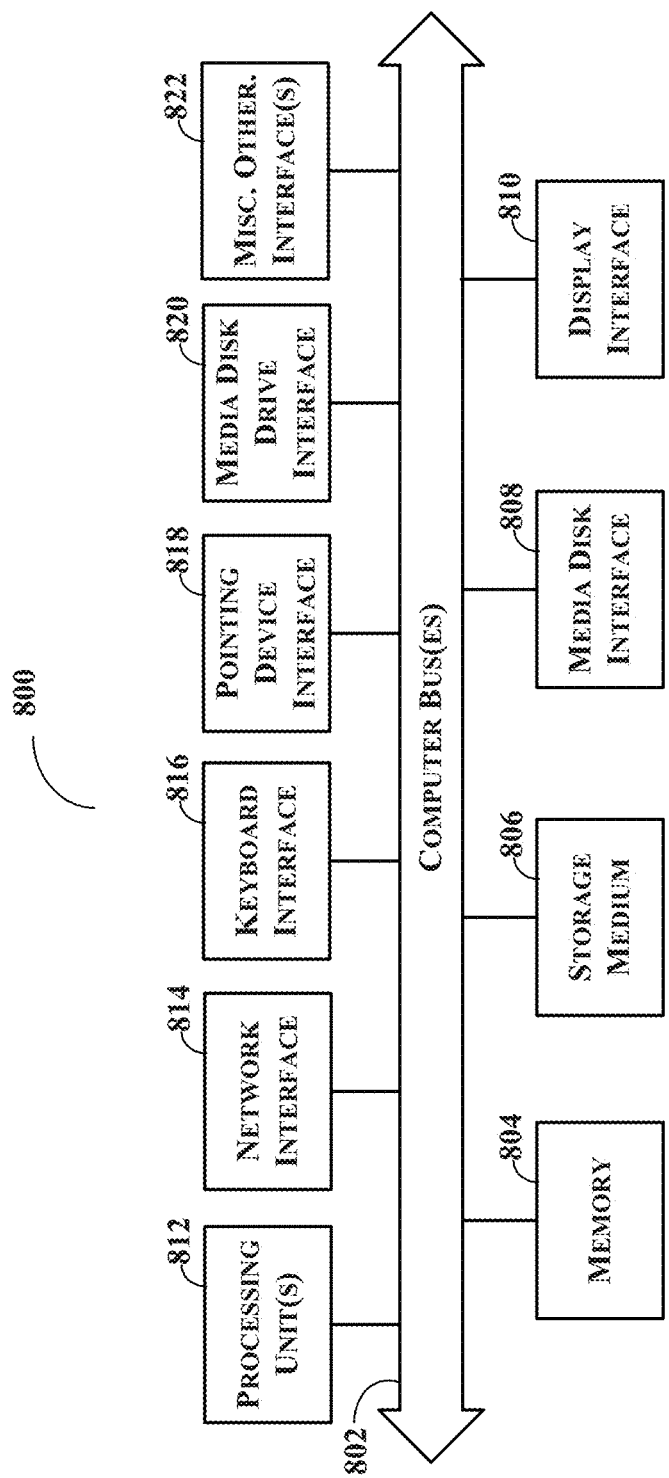
FIG. 8 is a detailed block diagram illustrating an internal architecture of a computing device in accordance with one or more embodiments of the present disclosure.

FIG. 8 is a detailed block diagram illustrating an internal architecture of a computing device, e.g., a computing device such as server 702 or user computing device 704, in accordance with one or more embodiments of the present disclosure. As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), etc., media disk drive interface 820 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, computer-readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

obtaining, by at least one computing device, data about a plurality of content items consumed using a plurality of devices, at least one of the devices is a multi-user device;

generating, by the at least one computing device and using the obtained data, a plurality of entities, each entity, of the plurality of entities, representing an associated type of consumption different from a type of consumption associated with each other entity of the plurality, the type of consumption associated with each entity indicating a type of content item for consumption, each entity being identified independent of those users of a plurality of users that use the plurality of devices to consume the plurality of content items;

identifying, by the at least one computing device and independent of the user using the multi-user device, an entity of the plurality using an entity over device distribution corresponding to the multi-user device, the entity over device distribution comprising a probability of the multi-user device being used to consume one or more content items of the plurality of content items of a type represented by the entity's associated type of consumption; and making, by the at least one computing device and using the identified entity of the plurality, a recommendation comprising one or more content items of the plurality for consumption using the multi-user device, the recommendation being made independent of information identifying which one or more users of the plurality is using the multi-user device.

2. The method of claim 1, the generating further comprising:

generating an item probability distribution over entity comprising a probability distribution for each entity of the plurality, each entity's probability distribution comprising a probability for each content item of the plurality, each content item's probability representing a probability of consumption of the content item in a context of the entity's associated type of consumption.

3. The method of claim 1, the generating further comprising:
generating an entity distribution over device comprising a probability distribution for each device of the plurality, each device's probability distribution comprising a probability for each entity of the plurality, each entity's probability representing a probability of the device being used to consume one or more content items of a type represented by the entity's associated type of consumption.

4. The method of claim 1, entity identification further comprising:
identifying the entity of the plurality of entities using information about a time interval to consume the one or more content items of the recommendation and information identifying the device of the plurality to be used to consume the one or more content items of the recommendation, the identifying further using a probability distribution determined for the time interval, the probability distribution comprising a probability for each entity of the plurality, each entity's probability indicating a likelihood of the device being used for the entity's associated type of consumption for the time interval.

5. The method of claim 1, further comprising:
generating an entity distribution over device comprising a probability distribution for each device of the plurality, each device's probability distribution comprising a probability for each entity of the plurality, each entity's probability representing a probability of the device being used to consume one or more content items of a type represented by the entity's associated type of consumption;
generating an item probability distribution over entity comprising a probability distribution for each entity of the plurality, each entity's probability distribution comprising a probability for each content item of the plurality, each content item's probability representing a probability of consumption of the content item in a context of the entity's associated type of consumption;
identifying the entity of the plurality of entities further comprising identifying the entity of the plurality of entities using information about the content item being consumed using the device of the plurality and information identifying the device of the plurality, the identifying using the entity distribution over device and the item distribution over entity.

6. The method of claim 1, making a recommendation further comprising:
ranking the plurality of content items according to each content item's probability of belonging to the entity used to make the recommendation; and
selecting a number of content items from the plurality using the ranking.

7. The method of claim 6, selecting further comprising:
selecting a number of content items from the plurality using the ranking and at least one filter.

8. A system comprising:
at least one computing device comprising one or more processors to execute and memory to store instructions to:
obtain data about a plurality of content items consumed using a plurality of devices, at least one of the devices is a multi-user device;
generate a plurality of entities using the obtained data, each entity, of the plurality of entities, representing an associated type of consumption different from a type of consumption associated with each other entity of the plurality, the type of consumption associated with each entity indicating a type of content item for consumption, each entity being identified independent of those users of a plurality of users that use the plurality of devices to consume the plurality of content items;
identify, independent of the user using the multi-user device, an entity of the plurality using an entity over device distribution corresponding to the multi-user device, the entity over device distribution comprising a probability of the multi-user device being used to consume one or more content items of the plurality of content items of a type represented by the entity's associated type of consumption; and
make, using the identified entity of the plurality, a recommendation comprising one or more content items of the plurality for consumption using the multi-user device, the recommendation being made independent of information identifying which one or more users of the plurality is using the multi-user device.

9. The system of claim 8, the instructions to generate further comprising instructions to:
generate an item probability distribution over entity comprising a probability distribution for each entity of the plurality, each entity's probability distribution comprising a probability for each content item of the plurality, each content item's probability representing a probability of consumption of the content item in a context of the entity's associated type of consumption.

10. The system of claim 8, the instructions to generate further comprising instructions to:
generate an entity distribution over device comprising a probability distribution for each device of the plurality, each device's probability distribution comprising a probability for each entity of the plurality, each entity's probability representing a probability of the device being used to consume one or more content items of a type represented by the entity's associated type of consumption.

11. The system of claim 8, the instructions to make a recommendation further comprising instructions to:
identify the entity of the plurality of entities using information about a time interval to consume the one or more content items of the recommendation and information identifying the device of the plurality to be used to consume the one or more content items of the recommendation, the identifying further using a probability distribution determined for the time interval, the probability distribution comprising a probability for each entity of the plurality, each entity's probability indicating a likelihood of the device being used for the entity's associated type of consumption for the time interval.

12. The system of claim 8, the instructions to make a recommendation further comprising instructions to:
generate an entity distribution over device comprising a probability distribution for each device of the plurality, each device's probability distribution comprising a probability for each entity of the plurality, each entity's probability representing a probability of the device being used to consume one or more content items of a type represented by the entity's associated type of consumption;
generate an item probability distribution over entity comprising a probability distribution for each entity of the plurality, each entity's probability distribution comprising a probability for each content item of the plurality, each content item's probability representing a probability of consumption of the content item in a context of the entity's associated type of consumption;

identify the entity of the plurality of entities using information about the content item being consumed using the device of the plurality and information identifying the device of the plurality, the identifying using the entity distribution over device and the item distribution over entity.

13. The system of claim 8, the instructions to make a recommendation further comprising instructions to:

rank the plurality of content items according to each content item's probability of belonging to the entity used to make the recommendation; and select a number of content items from the plurality using the ranking.

14. The system of claim 13, the instructions to select further comprising instructions to:

select a number of content items from the plurality using the ranking and at least one filter.

15. A computer readable non-transitory storage medium for tangibly storing thereon computer readable instructions that when executed cause at least one processor to:

obtain data about a plurality of content items consumed using a plurality of devices, at least one of the devices is a multi-user device;

generate a plurality of entities using the obtained data, each entity, of the plurality, representing an associated type of consumption different from a type of consumption associated with each other entity of the plurality, the type of consumption associated with each entity indicating a type of content item for consumption, each entity being identified independent of those users of a plurality of users that use the plurality of devices to consume the plurality of content items;

identify, independent of the user using the multi-user device, an entity of the plurality using an entity over device distribution corresponding to the multi-user device, the entity over device distribution comprising a probability of the multi-user device being used to consume one or more content items of the plurality of content items of a type represented by the entity's associated type of consumption; and make, using the identified entity of the plurality, a recommendation comprising one or more content items of the plurality for consumption using the multi-user device, the recommendation being made independent of information identifying which one or more users of the plurality is using the multi-user device.

16. The medium of claim 15, the instructions to generate further comprising instructions to:

generate an item probability distribution over entity comprising a probability distribution for each entity of the plurality, each entity's probability distribution comprising a probability for each content item of the plurality, each content item's probability representing a probability of consumption of the content item in a context of the entity's associated type of consumption.

17. The medium of claim 15, the instructions to generate further comprising instructions to:

generate an entity distribution over device comprising a probability distribution for each device of the plurality, each device's probability distribution comprising a probability for each entity of the plurality, each entity's probability representing a probability of the device being used to consume one or more content items of a type represented by the entity's associated type of consumption.

18. The medium of claim 15, the instructions to make a recommendation further comprising instructions to:

identify the entity of the plurality of entities using information about a time interval to consume the one or more content items of the recommendation and information identifying the device of the plurality to be used to consume the one or more content items of the recommendation, the identifying further using a probability distribution determined for the time interval, the probability distribution comprising a probability for each entity of the plurality, each entity's probability indicating a likelihood of the device being used for the entity's associated type of consumption for the time interval.

19. The medium of claim 15, the instructions to make a recommendation further comprising instructions to:

generate an entity distribution over device comprising a probability distribution for each device of the plurality, each device's probability distribution comprising a probability for each entity of the plurality, each entity's probability representing a probability of the device being used to consume one or more content items of a type represented by the entity's associated type of consumption;

generate an item probability distribution over entity comprising a probability distribution for each entity of the plurality, each entity's probability distribution comprising a probability for each content item of the plurality, each content item's probability representing a probability of consumption of the content item in a context of the entity's associated type of consumption;

identify the entity of the plurality of entities using information about the content item being consumed using the device of the plurality and information identifying the device of the plurality, the identifying using the entity distribution over device and the item distribution over entity.

20. The medium of claim 15, the instructions to make a recommendation further comprising instructions to:

rank the plurality of content items according to each content item's probability of belonging to the entity used to make the recommendation; and select a number of content items from the plurality using the ranking.

21. The medium of claim 20, the instructions to select further comprising instructions to:

select a number of content items from the plurality using the ranking and at least one filter.

\* \* \* \* \*